(12) United States Patent
Brown et al.

(10) Patent No.: US 11,849,318 B2
(45) Date of Patent: Dec. 19, 2023

(54) WIRELESS COMMUNICATION NETWORK AUTHENTICATION

(71) Applicant: BRITISH TELECOMMUNICATIONS PUBLIC LIMITED COMPANY, London (GB)

(72) Inventors: Ruth Brown, London (GB); Jonathan Hart, London (GB)

(73) Assignee: BRITISH TELECOMMUNICATIONS PLC, London (GB)

( * ) Notice: Subject to any disclaimer, the term of this patent is extended or adjusted under 35 U.S.C. 154(b) by 21 days.

(21) Appl. No.: 15/733,621

(22) PCT Filed: Mar. 18, 2019

(86) PCT No.: PCT/EP2019/056675
§ 371 (c)(1),
(2) Date: Sep. 17, 2020

(87) PCT Pub. No.: WO2019/179925
PCT Pub. Date: Sep. 26, 2019

(65) Prior Publication Data
US 2021/0099867 A1    Apr. 1, 2021

(30) Foreign Application Priority Data
Mar. 22, 2018    (EP) .................................... 18163426

(51) Int. Cl.
*H04W 12/06*    (2021.01)
*H04W 12/72*    (2021.01)
(Continued)

(52) U.S. Cl.
CPC ........... *H04W 12/06* (2013.01); *H04W 12/03* (2021.01); *H04W 12/041* (2021.01); *H04W 12/35* (2021.01); *H04W 12/72* (2021.01)

(58) Field of Classification Search
CPC ..... H04W 12/06; H04W 12/001; H04W 9/08; H04W 12/04; H04W 8/245; H04W 12/72;
(Continued)

(56) References Cited

U.S. PATENT DOCUMENTS

| 8,929,931 B1 | 1/2015 | Goldberg et al. |
| 10,111,159 B2 | 10/2018 | Scahill et al. |

(Continued)

FOREIGN PATENT DOCUMENTS

| CN | 102934470 A | 2/2013 |
| CN | 104412633 A | 3/2015 |

(Continued)

OTHER PUBLICATIONS

EP Search Report for Application No. 10201209.3 dated Mar. 11, 2020, 12 Pages.
(Continued)

*Primary Examiner* — Iqbal Zaidi
(74) *Attorney, Agent, or Firm* — PRANGER LAW PC

(57) ABSTRACT

A method of authenticating a device subscribed to a first wireless communication network on a second wireless communication network, the method including: deriving at a node within the first wireless communication network a set of one or more network keys for the second wireless communication network from one or more network keys of the first wireless communication network that uniquely identify the device within the first wireless communication network; communicating the derived set of one or more network keys to the device; storing a first copy of the derived set of one or more network keys within an identification module at the device and a second copy of the derived set of one or more network keys within a secure area of the device; and authenticating the device on the second wireless communication network using the second copy of the derived set
(Continued)

of one or more network keys stored in the secure area of the device.

14 Claims, 6 Drawing Sheets

(51) Int. Cl.
*H04W 12/03* (2021.01)
*H04W 12/30* (2021.01)
*H04W 12/041* (2021.01)

(58) Field of Classification Search
CPC ... H04W 8/18; H04W 12/71; H04W 72/0473; H04W 4/80; H04L 63/0435; H04L 47/25; H04L 63/08; H04L 9/32; H04L 29/06; H04L 9/0637; H04L 9/008; H04L 9/3242; H04L 9/3247; G06F 21/06
See application file for complete search history.

(56) References Cited

U.S. PATENT DOCUMENTS

| | | | |
|---|---|---|---|
| 10,681,072 B2 * | 6/2020 | Alfano | H04L 43/062 |
| 2005/0008159 A1 | 1/2005 | Grilli | |
| 2011/0013117 A1 | 1/2011 | Egi | |
| 2011/0235802 A1 | 9/2011 | Kokkinen | |
| 2011/0243020 A1 | 10/2011 | Ponnuswamy | |
| 2013/0013923 A1 | 1/2013 | Thomas | |
| 2014/0094142 A1 | 4/2014 | Torres et al. | |
| 2014/0328257 A1 | 11/2014 | Kamlani | |
| 2015/0074782 A1 | 3/2015 | Zhang | |
| 2015/0163056 A1 | 3/2015 | Nix | |
| 2015/0365158 A1 | 12/2015 | Kindler | |
| 2016/0036922 A1 | 2/2016 | Centemeri et al. | |
| 2016/0255064 A1 * | 9/2016 | Naslund | H04L 9/0816 726/3 |
| 2017/0347298 A1 | 11/2017 | Brown et al. | |
| 2017/0359759 A1 | 12/2017 | Brown et al. | |
| 2017/0374548 A1 * | 12/2017 | Mason | H04L 63/062 |
| 2019/0098556 A1 | 3/2019 | Johnson et al. | |
| 2021/0099867 A1 * | 4/2021 | Brown | H04W 12/04 |

FOREIGN PATENT DOCUMENTS

| | | |
|---|---|---|
| CN | 105101337 A | 11/2015 |
| EP | 2448301 | 5/2012 |
| EP | 2645783 A1 | 10/2013 |
| EP | 2741535 A1 | 6/2014 |
| GB | 2485388 A | 5/2012 |
| GB | 2554462 A | 4/2018 |
| WO | WO2007139883 | 12/2007 |
| WO | WO2011001076 | 1/2011 |
| WO | WO-2013152305 A1 | 10/2013 |
| WO | WO-2014146679 A1 | 9/2014 |
| WO | WO2016160256 | 10/2016 |
| WO | WO-2018060058 A1 | 4/2018 |
| WO | WO-2018060092 A1 | 4/2018 |
| WO | WO2019179925 | 9/2019 |

OTHER PUBLICATIONS

GB Combined Search and Examination Report For 1914256 dated Mar. 26, 2020, 6 Pages.
International Search Report, Application No. PCT/EP2019/056675, dated Apr. 5, 2019, 3 Pages.
3GPP TS 24.234 V12.2.0 (Mar. 2015) "3rd Generation Partnership Project: Technical Specification Group Core; Network and Terminals: 3GPP System to Wireless Local Area Network (WLAN) interworking; WLAN User Equipment (WLAN UE) to network protocols; Stage 3 (Release 12)," 3GPP Standard; 3GPP TS 24.234, 3rd Generation Partnership Project (3GPP), Mobile Competence Centre; 650, Route Des Lucioles; F-06921 Sophia-Antipolis Cedex; France, vol. CT WG1, No. V12.2.0, Mar. 20, 2015 (Mar. 20, 2015), pp. 1-40, XP050927885, section 6, pp. 20-26 and section 8, pp. 28-36.
U.S. Appl. No. 16/338,553, filed Apr. 1, 2019, Inventor(s): Schaill.
U.S. Appl. No. 16/335,417, filed Mar. 21, 2019, Inventor(s): Ringland.
International Search Report and Written Opinion for Application No. PCT/EP2017/057206, dated Apr. 24, 2017, 14 pages.
International Search Report and Written Opinion for Application No. PCT/EP2017/073961, dated Dec. 21, 2017, 9 pages.
International Search Report and Written Opinion for Application No. PCT/EP2017/074056, dated Nov. 22, 2017, 9 pages.
Office Action For Chinese Application No. 201980020479.6, dated Jan. 6, 2022, 9 pages.
International Preliminary Report on Patentability for PCT application No. PCT/EP2020/077124, dated Apr. 14, 2022, 12 pages.
Communication pursuant to Article 94(3) EPC for European Application No. 19709981.5, dated Jul. 11, 2022, 9 pages.
Office action for Chinese Application No. 201980020479.6, dated Jun. 8, 2022, 8 pages.

* cited by examiner

WIRELESS COMMUNICATION NETWORK AUTHENTICATION

PRIORITY CLAIM

The present application is a National Phase entry of PCT Application No. PCT/EP2019/056675, filed Mar. 18, 2019, which claims priority from EP Patent Application No. 18163426.2, filed Mar. 22, 2018, each of which is hereby fully incorporated herein by reference.

FIELD

This disclosure relates to the authentication of a device on a wireless communication network having no roaming agreement and/or physical connections to the device's home network.

BACKGROUND

Wireless communication networks are typically managed by a network operator, referred to as a mobile network operator, or MNO. A wireless communication device can be registered as a subscriber to a communication network. The communication network the device subscribes to may be referred to as the device's home network.

It is often desirable for a device to be able to connect to other communication networks other than its home communication network, for example to access resources available on those networks. For clarity, these other networks may be referred to as guest networks.

Roaming is a well-known approach to enable a device to access a network other than its home network. Roaming is facilitated through the provision of roaming agreements. Roaming agreements are agreements between MNOs of different communication networks that enable subscribers of one communication network managed by a first MNO to communicate over, or access, another communication network managed by a second MNO.

FIG. 1 is a diagram showing an example roaming architecture for two communication networks 100 and 102. In this example, each communication network is a long-term evolution (LTE) network. Network 100 is managed by a first mobile network operator MNO1, and network 102 is managed by a second mobile network operator MNO2. Devices 104 and 106 (also referred to user equipment (UE)) located within network 102 are subscribers to network 100. In other words, network 100 is the home network for devices 104 and 106. Devices 104 and 106 therefore include a subscriber identity module (SIM) provisioned by MNO1. The roaming agreement between MNO1 and MNO2 enables devices 104 and 106 to access guest network 102 using its access credentials provisioned by the mobile network operator MNO1 of the network 100.

Though roaming agreements enable a device to access a guest network using a single SIM provisioned by the device's home network operator, roaming suffers from the drawback of requiring interconnects between the communication networks. Example interconnects are shown in FIG. 1 at 108, 110 and 112. Interconnect 108 is an Sha interface between a mobility management entity (MME) 114 of the guest network and the home subscriber server (HSS) 116 of the home network. Interconnect 110 is an S8 interface between a serving gateway (SGW) 118 of the guest network and a packet data network gateway (PGW) 120. Interconnect 112 is an S9 interface between a policy and charging rules function (PCRF) 122 of the guest network and the PCRF 124 of the home network. If there are no interconnects between two communication networks, roaming cannot be implemented to enable a device to access a guest network.

Another approach to enable a device to access networks other than its home network is international mobile subscriber identity (IMSI) switching. The IMSI is used to identify the device of a communication network. It is a unique identification for the device within all wireless communication networks. IMSI switching refers to switching the IMSI for the device's home network over to a different IMSI for a second network. That is, IMSI switching requires that multiple IMSIs be stored on a single SIM. Once the IMSI has been switched the IMSI for the second network, the device is able to access that second network. IMSI switching may be controlled by a SIM application. IMSI switching can be triggered when no network coverage for the device's home network is detected. IMSI switching has the associated risk that the SIM application switches the IMSI when this is not desired (e.g., in rural spots, underground, in lifts etc.).

Another approach to enable a device to access guest networks is the use of roaming hubs. A roaming hub enables a device to access a guest network through the hub. That is, the roaming hub has a roaming agreement with the guest network. By connecting to the hub, the device can then access the guest network. Though roaming hubs do not require a roaming agreement between the device's home network and the guest network, they do still require an interconnect between the roaming hub and the guest network.

SUMMARY

According to the present disclosure there is provided a method of authenticating a device subscribed to a first wireless communication network on a second wireless communication network, the method comprising: deriving at a node within the first wireless communication network a set of one or more network keys for the second wireless communication network from one or more network keys of the first wireless communication network that uniquely identify the device within the first wireless communication network; communicating the derived set of one or more network keys to the device; storing a first copy of the derived set of one or more network keys within an identification module at the device and a second copy of the derived set of one or more network keys within a secure area of the device; and authenticating the device on the second wireless communication network using the second copy of the derived set of one or more network keys stored in the secure area of the device.

Optionally, deriving a set of one or more network keys for the second wireless communication network is triggered by the first and/or second wireless communication network(s).

The method may further comprise, after authentication of the device on the second wireless communication network: communicating a copy of the set of one or more derived network keys from the secure area of the device to a node of the second wireless communication network for use in subsequent attachments of the device to the second wireless communication network.

The copy of the derived set of one or more network keys may be communicated from the secure area of the device to the node of the second wireless communication network in response to receiving at the device a message requesting the derived network keys.

The method may further comprise deleting the second copy of the set of one or more derived network keys from the secure area of the device after communication of those network key from the secure area to the node of the second wireless communication network.

The method may further comprise storing at the node of the second wireless communication the set of one or more derived network keys against an identification code for the device for use in subsequent attachments of the device to the second wireless communication network.

The identification code may be an international subscriber mobile identity (IMSI).

The set of one or more network keys for the second wireless communication network may be derived by an algorithm which receives as an input the one or more network keys of the first wireless communication network.

The method may further comprise subsequently attaching the device to the second wireless communication network using the first copy of the derived set of one or more network keys stored in the identification module of the device at a time after the device has been authenticated using the second set of derived network keys stored in the secure area.

The one or more network keys of the first wireless communication network may comprise an authentication key K and an operational code Opc derived from K.

The first wireless communication network may be a long term evolution (LTE) network and the second wireless communication network an LTE network. The second wireless communication network may be a private network.

The secure area may be a secure element of the device. The secure area may be an encrypted portion (physical and/or logical) of the device.

The identification module may be a subscriber identifier module (SIM).

The node within the first wireless communication network may be a key management unit forming part of a subscription management system.

The node of the second wireless communication network may be a subscriber server.

According to another aspect of the present disclosure there is provided a communication system comprising: a first wireless communication network; a device subscribed to the first wireless communication network, the device comprising an identification module and a secure area; and a second wireless communication network; wherein the first wireless communication network comprises a node configured to: derive a set of one or more network keys for the second wireless communication network from one or more network keys of the first wireless communication network that uniquely identify the device within the first wireless communication network; and communicate the derived set of one or more network keys to the device for storage as a first copy within the identification module and as a second copy within the secure area; wherein the second wireless communication network is configured to authenticate the device using the second copy of the derived set of one or more network keys stored in the device's secure area.

According to another aspect of the present disclosure there is provided a device subscribed to a first wireless communication network and configured to be authenticated on a second wireless communication network, the device comprising: an identification module storing a set of one or more network keys for the first wireless communication network that uniquely identify the device within the first wireless communication network, the identification module further storing a first copy of a set of one or more network keys for the second wireless communication network received from a node of the first wireless communication network, the set of one or more network keys for the second wireless communication network being derived from the set of one or more network keys for the first wireless communication network; and a secure area storing a second copy of the set of one or more network keys for the second wireless communication network received from the node of the first wireless communication network; wherein the device is configured to participate in an authentication procedure to authenticate itself on the second wireless communication network using the second copy of the set of one or more network keys for the second wireless communication network stored in the secure area.

BRIEF DESCRIPTION OF DRAWINGS

The present disclosure will now be described by way of example with reference to the accompanying drawings. In the drawings.

DETAILED DESCRIPTION

The present disclosure is directed to an approach for enabling a device subscribed to a first wireless communication network to access a second wireless communication network that does not have any physical connections and/or roaming agreements with the first network. To do this, a set of one or more network keys for the second network are derived from a set of one or more network keys of the first network. Each of the network keys for the first network may uniquely identify the device within that network. The derived set of network keys for the second network are then communicated to the device. A first copy of the derived network keys is stored on the device's identification module (e.g. SIM), and a second copy of the derived network keys is stored in a secure area of the device (e.g. a secure element). The device then authenticates itself on the second communication network using the network keys stored in the secure area of the device. Following the initial authentication, a copy of the network keys is communicated from the secure area of the device to a node within the second communication network for use in subsequent attachment procedures. The network keys for the second network may be stored against an identifier for the device, such as its IMSI. The copy of the network keys stored in the secure area are then deleted, leaving the copy stored in the identification module as the sole copy stored on the device. This remaining copy of the network keys for the second network are used for subsequent attachment procedures to the second network. As will be explained in more detail below, this approach enables a device with a single SIM to access a guest network without a roaming agreement with the home subscriber network. It also enables the device to access the guest network without the requirement of explicitly sharing the same key information between the two networks, thus avoiding compromising security requirements.

Examples of authenticating a device on a non-home subscriber network will now be described with reference to FIGS. 2 to 6. These examples will describe the authentication and attachment of a device in the context of long term evolution (LTE) networks. It is to be understood that this is for the purposes of illustration only, and that the following techniques, approaches and examples can be applied within different types of wireless communication networks.

Figure 1:
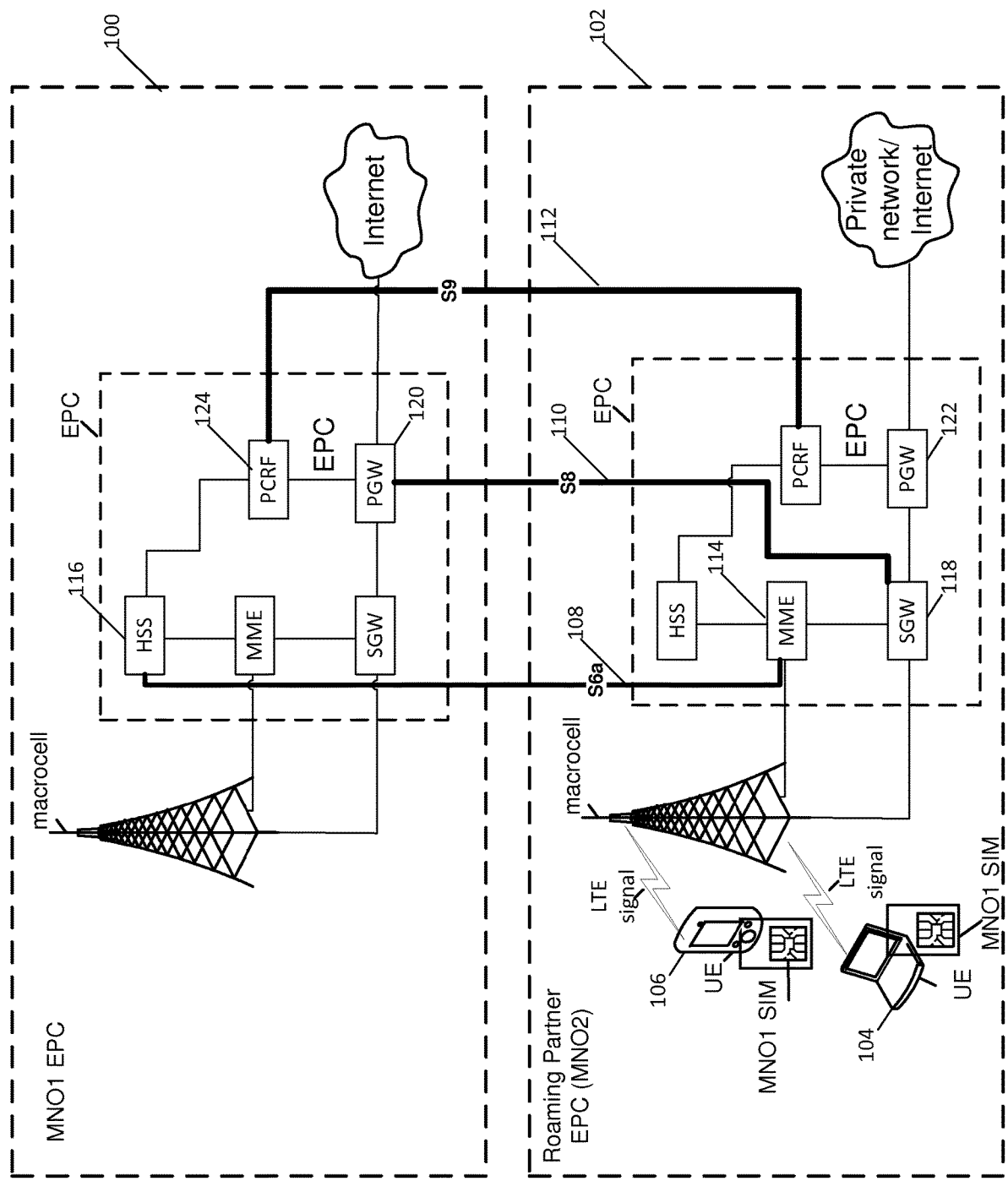
FIG. 1 shows an example of two wireless communication networks with a roaming agreement in place.
Figure 2:
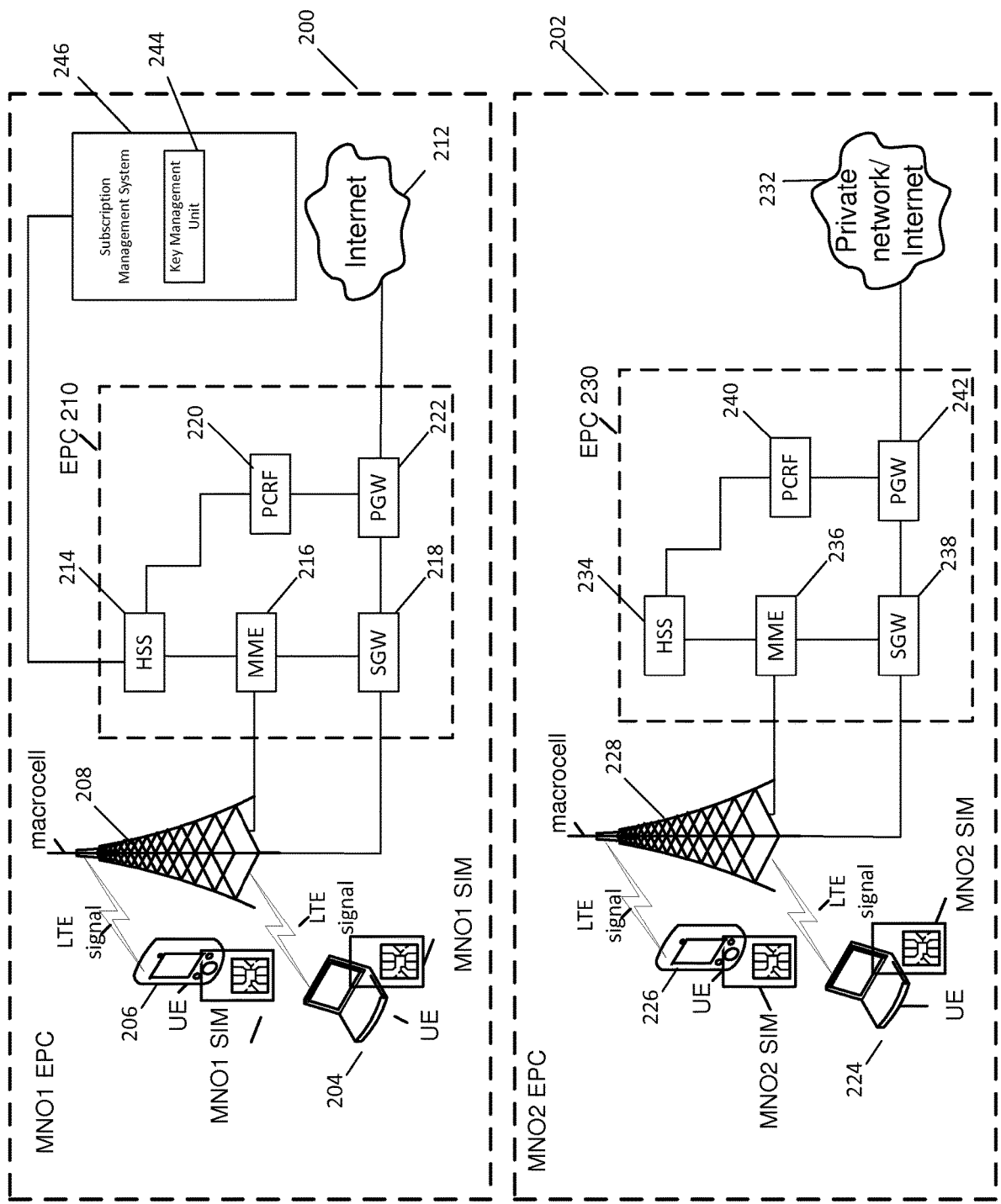
FIG. 2 shows an example of two wireless communication networks with no roaming agreements or physical interconnections.

FIG. 2 shows a first wireless communication network 200 and a second wireless communication network 202. Network 200 is managed by a first mobile network operator MNO1. Network 202 is managed by a second mobile network operator MNO2. There are no roaming agreements between networks 200 and 202, thus there are no interconnects or interfaces between the two networks. Neither are there any other physical connections between the two networks. For the purpose of illustration, network 200 is taken to be a public network, and network 202 is taken to be a private network. Generally speaking, a public network is one which is open for general use, and a private network is one that can only be accessed by select devices set by the owner (e.g. the mobile network operator) of the network.

Networks 200 and 202 are in this example both LTE networks. The network 200 comprises a user equipment (UE) 204 and 206, an eNodeB 208, and an evolved network core (EPC) 210. The EPC connects to an external packet data network 212, which in the example illustrated here is the internet.

UEs may be any suitable type of device capable of participating in wireless communications. A UE could be, for example, a mobile phone, smartphone, laptop, PC, tablet, etc. In the example shown here, UE 206 is a mobile device, and UE 204 is a laptop. A UE may be referred to interchangeably herein as a device.

UEs 204 and 206 are subscribers to network 200 (i.e. network 200 is the home network for UEs 204 and 206). Consequently, UEs 204 and 206 are shown as including a SIM provisioned by the MNO1.

Figure 3:
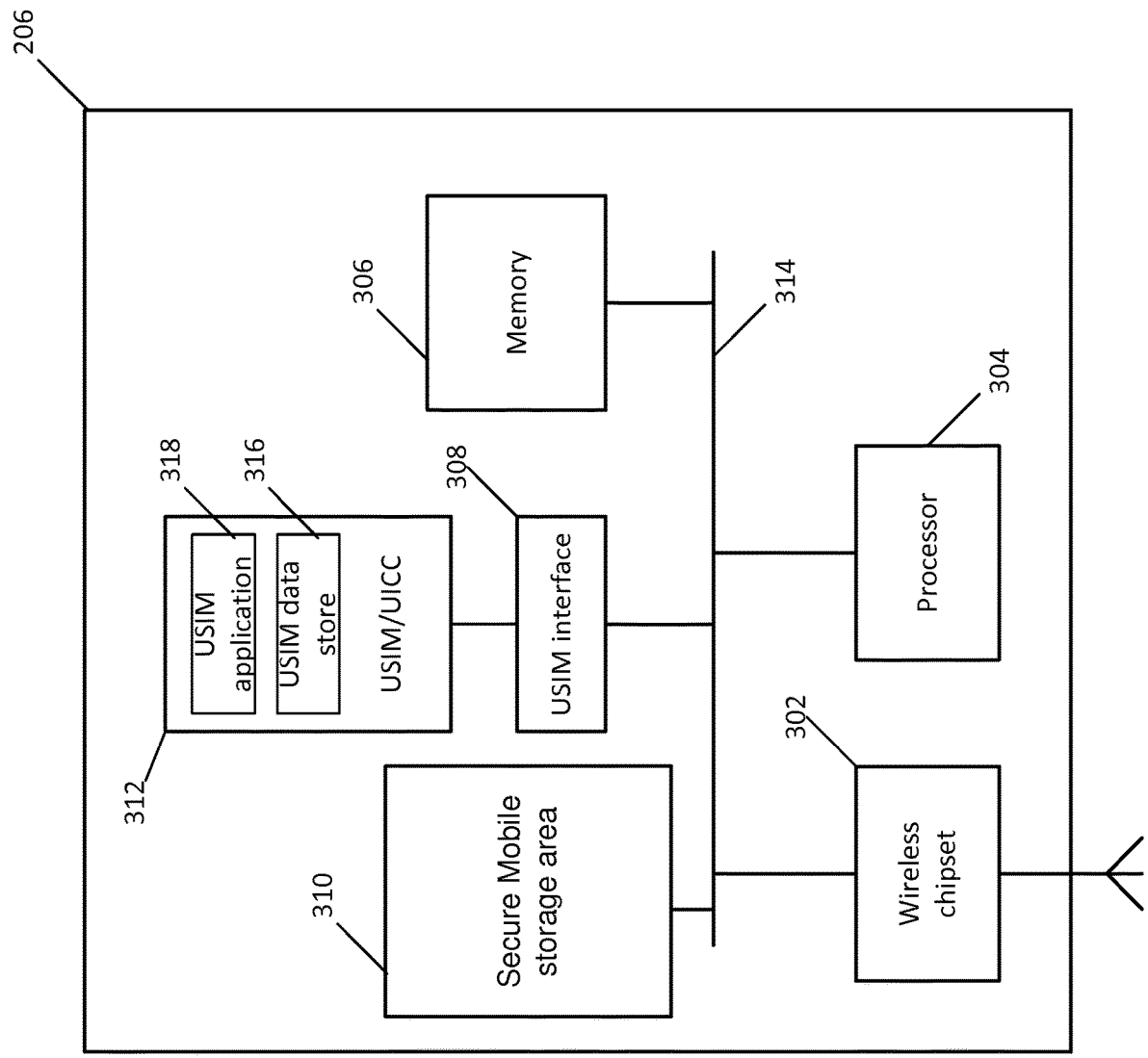
FIG. 3 shows example components of a device capable of communicating in the wireless communication networks.

FIG. 3 shows an example architectural layout of various components of a UE. For the purpose of illustration, FIG. 3 shows the components of UE 206, though other UEs may have similar components.

The UE 206 comprises a wireless chipset 302, processor 304, memory 306, a universal subscriber identity module (USIM) 312, and USIM interface 308 and a secure storage area 310. These components are connected by interconnect circuitry 314, which may for example be a bus.

The wireless chipset 302 may manage the transmission and reception of wireless messages from and to the UE 206. Processor 304 may operate to perform general processing functions for the UE 206. Memory 306 stores data for the UE 206. Though only a single memory block is shown in FIG. 3, it will be appreciated that memory block 306 may correspond to one or more separate blocks of memory of the same or different types. For example, the UE 206 may include one or more blocks of RAM and/or one or more blocks of ROM.

The USIM 312 is an example of an identification module. It stores identification information for the device along with a set of one or more network keys for the device's home network 200. The identification information stored on the USIM 312 may be the device's IMSI. The set of one or more network keys may identify and authenticate the device 206 within the home network 200. The set of one or more network keys stored within the USIM 312 may uniquely identify the device 206 within the communication network 200. That is, each of the set of one or more network keys may be unique to the device 206 within the communication network 200. In this particular example, the set of network keys includes an authentication key K and a unique operator code Opc. The authentication key K is unique to the device. It is assigned by the network operator (in this example, MNO1), and is used for authenticating the device on the network. The authentication key K is also stored within the network 200, typically in the HSS 214 or in an authentication center (AuC) (not shown in FIG. 2). The authentication key K may also be referred to as a USIM Individual key (e.g. as in 3GPP TS 31.102); a permanent key (e.g. as referred to in 3GPP TS 33.401); or a long-term secret key shared between the USIM and AuC (e.g. as referred to in 3GPP TS 33.102).

The unique operator code Opc is derived from a network-operator-specific code Op and the unique authentication key K. As such, the code Opc is also unique to the device 206. The code Opc is also used to identify and authenticate the device 206 on the home network 200. Thus, in summary, each of the set of network keys stored within the USIM 312 uniquely identifies the device 206 within its home network 200, and is used to identify and authenticate the device within the home network 200.

Other device identification information stored in the USIM 312 may include the mobile station international subscriber directory number (MSISDN); and the international mobile equipment identity (IMEI) number. This device identification information may be stored in the USIM data store 316. The data store 316 may have a hierarchical memory structure. For example, the data store 316 may be arranged into a hierarchical file system that includes a master file (MF), one or more dedicated files (DF) and one or more elementary files (EF). The one or more DFs sit below the MF; i.e. they are subordinate files to the MF. The EFs sit below the DFs. One or more EFs may sit below each DF. In general, the EFs store the data for a SIM. Thus, the MSISDN and the IMEI may be stored in EFs. It will be appreciated that the USIM 312 will include other EFs not detailed here.

The set of one or more network keys may be stored in a secure region of memory in the USIM 312 (not shown in FIG. 3). The secure region of memory may be encrypted. The secure region of memory may be a protected region of memory. It may be tamperproof from external entities (i.e., entities external of the USIM, such as other components of the device 206 including the USIM interface 308). Thus, the secure region of memory may be an externally unreadable region of memory. That is, the network keys might be non-retrievable from the region of memory in which they are stored by applications and components external to the USIM 312. The secure region may be accessible (e.g. readable) by the USIM application 318. The USIM application 318 may for example access the network keys in the secure region to create session keys during an attachment procedure.

The USIM 312 also includes a USIM application 318, which can run on the SIM to perform the various functions provided by the USIM 312.

The USIM 312 may run on, or form part of, a universal integrated circuit card (UICC) smartcard (not shown in FIG. 3 for clarity). The UICC smartcard may be embedded within the device 206 (i.e. fixed within the device). Alternatively, the UICC smartcard may be insertable into device 206 but capable of being removed from the device 206. In other words, the UICC may be removable.

The USIM 312 is connected to the other components of the UE 206 through the USIM interface 308. The USIM interface 308 can control how data stored on the USIM 312 (except within the secure region of memory) may be retrieved from the USIM 312. In other words, the USIM interface 308 controls access to the data stored on the USIM 312.

The secure storage area 310 is used for securely storing confidential information. The secure storage area 310 may be tamper-resistant. It may be a fully encrypted storage area (i.e. it may store data in an encrypted format). The secure storage area 310 may store data to a higher level of security (e.g. to a higher level of encryption, or to a higher level of inaccessibility or tamper-resistance) than the USIM 312 (including the secure region of memory in the USIM 312). Thus, data stored in the secure storage area 310 may be more trusted to a third party—such as a communication network node—than data stored in the USIM 312.

The secure storage area 310 may be a secure element. The storage area 310 may form part of the UICC. That is, the storage area may be a defined area of the UICC that is non-accessible to the remaining components of the UICC (including the USIM 312). Alternatively, secure storage area 310 may be a separate component to the UICC, for example it may be a hardware component such as a chip. If a separate component to the UICC, the storage area 310 may be embedded within the device 206.

It will be appreciated that a UE may include additional components to those shown in FIG. 3, and that only a selection of components have been illustrated and described for the purposes of clarity.

Referring back to FIG. 2, the eNodeB 208 is an example of a base station and operates to connect the UEs to the EPC 210.

The EPC 210 comprises a number of components. In the example shown, these are: a mobility management entity (MME) 216; a serving gateway (SGW) 218; a packet data network gateway (PGW) 222; a policy charging and rules function (PCRF) unit 220 and a home subscriber server (HSS) 214. Each of these components may be referred to herein as nodes.

Network 202 comprises UEs 224 and 226, an eNodeB 228, and an evolved network core (EPC) 230. The EPC 210 connects to an external packet data network 232, which in the example illustrated here is a private network.

UEs 224 and 226 are subscribers to network 202 (i.e. network 202 is the home network for UEs 224 and 226). Consequently, UEs 224 and 226 are shown as including a SIM provisioned by the MNO2.

EPC 230 includes an HSS 234, an MME 236, an SGW 238, a PCRF 240 and a PGW 242.

A brief overview of the components within the EPC will now be described. It will be appreciated that this overview applies equivalently to the components of EPC 210 and 230.

The MME operates to process the signaling between the UEs and the EPC. The MME also operates to select an SGW for a UE during an initial attachment, and to select a PGW. The SGW is responsible for controlling handovers of the UE to neighboring eNodeBs.

The SGW may also retain information on the bearers when a UE is an idle state. It can buffer downlink data while the MME operates to re-establish a bearer. The SGW also functions as a router between the eNodeB and the PGW.

The PGW operates to provide connectivity between the UE and the external PDN. It is the point of entry to or exit from the LTE network of data packets for the UE.

The HSS contains subscription data for users of the network. It may store information about the PDN's a UE can connect to. The HSS may also store the identity of the MME to which the UE is currently attached, or registered.

The PCRF performs policy control and decision making. It can provide QoS authorization for UE's participating in communication sessions and manage data flows in accordance with a user's subscription profile.

Network 200 further comprises a key management unit (KMU) 244. The key management unit 244 operates to generate a UE's network keys for the network 202. This will be explained in more detail below. In the example illustrated in FIG. 2, the key management unit 244 is included within a subscription management system (SuMS) 246. The SuMS may be a server. The SuMS 244 is communicatively coupled to the HSS 214. The SuMS 246 and HSS 214 may be connected by a secure communication link. That communication link could be a wired and/or wireless link. The SuMS 246 (and hence the key management unit 244) are shown as being external to the EPC 210. In other implementations, the SuMS 246 and KMU 244 may be included within the EPC 210.

In other implementations, the key management unit 244 (and potentially also the SuMS 246) could be included within the HSS 214. In other words, the key management unit 244 could form part of the HSS 214. In this case, the key management unit 244 may be separated from the storage and repository functionality of the HSS 214. For example, repositories within the HSS 214 may be accessed by the key management unit 244 through an API.

Figure 4:
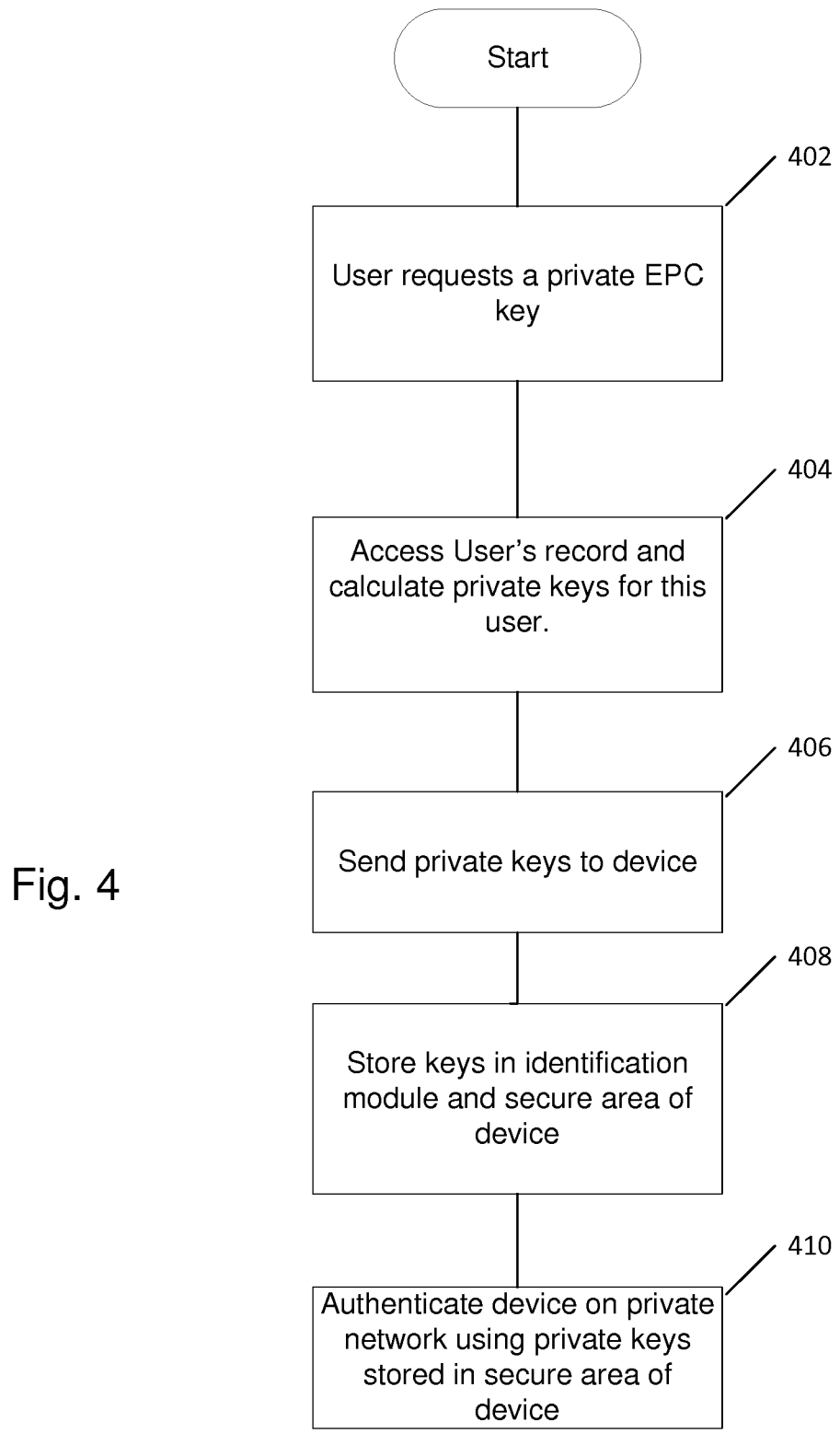
FIG. 4 is a flowchart showing steps of a method of authenticating a device onto a visiting network other than its home network in accordance with the present disclosure.

An approach to enable a device comprising only a single SIM to connect to a communication network other than its home network will now be described with reference to the flowchart shown in FIG. 4. For the purposes of this explanation, the device in question will be taken to be UE 206. To recall, UE 206 has as its home network the network 200, and in accordance with the approach described herein will connect to network 202, which has neither a roaming agreement nor physical connections with network 200. Network 202 may therefore be referred to as a guest network, or visiting network.

At 402, a user of device 206 requests a set of one or more network keys for the network 202. Because in this example the network 202 is a private network, the set of network keys for this network may be referred to interchangeably as private network keys.

A user may request the private network keys by providing a node within the device 206's home network 200 with information identifying the device 206 and information identifying the network 202. The node within the network 200 may be the subscription management system 246. The information identifying the device 206 may include one or more of: 1) the device's IMSI; 2) the device's MSISDN; and 3) the device's IMEI. This information may be retrieved from the device's USIM 312. The information identifying the network 202 may include the network name for the network 202, for example the public land mobile network (PLMN) name.

The identification information for the device 206 and network 202 may be provided to the subscription management system 246 in a variety of ways. In some examples, the information may be communicated to the subscription management system 246 from the device 206. In other examples, a user of the device may provide the information through a secure portal, for example a secure webpage.

At 404, the user's/device's records are accessed and the private keys are generated for the device. This may be performed by the key management unit 244 of the home network 200. The KMU 244 can generate the private network keys from the device's set of one or more network keys for the home communication network 200. In other words, the network keys for the private network 202 are generated from the network keys of the home network 200.

Each private network key may be generated from a respective home network key. Each private network key may be generated by implementing a mathematical algorithm which receives as its input a home network key. The level of complexity of the mathematical algorithm used to generate the private keys may be implementation specific. In some examples, each private key may be generated by multiplying a respective home network key by a random number. As another example, a hashing function may be implemented to generate a hash value from a home network key. The generated hash value may be the private network key. In other examples, a series of mathematical functions may be applied to a home network key to generate a private network key. Each private network key may be of the same bitlength (i.e. contain the same number of bits) as the home network key from which it was generated.

As described above, the device's network keys for the home network 200 are stored in an externally unreadable portion of memory within the USIM 312. However, a copy of the device's home network keys may also be stored within the HSS 214. In particular, a profile for device 206 may be stored within the HSS 214 that includes the device's home network keys.

The KMU 244 retrieves the device's home network keys from the HSS 214 over the secure communication link connecting the KMU 244 and HSS 214. In implementations in which the KMU 244 forms part of the HSS 214, the device 206's profile may be stored within a repository in the HSS 214 separate from the KMU 244. The KMU 244 may then access the repository through an API to retrieve the device 206's home network keys.

The KMU 244 may retrieve the device's home network keys using the identification information for the device 206 received at step 402. For example, the KMU 244 may identify and access the device's stored profile using the information identifying the device 206 received at 402 to retrieve the home network keys. Once the home network keys for the device 206 have been retrieved, the KMU 244 can derive the private network keys for the device 206. This approach therefore enables the private network keys to be generated without requiring the home network keys to be shared externally of the network 200.

In the present example, the device's home network keys include the authentication key K and the operator code Opc. The private network keys generated for device 206 from these home network keys are denoted herein as pK and pOpc. The private key pK is generated from the home network key K, and the private key pOpc is generated from the home network key Opc. The key pK may be referred to as the private network authentication key, and the key kOpc may be referred to as the private operator code key.

At 406, the generated private keys are communicated to the device 206 from a node in the communication network 200. Following the present example, the private network keys may be communicated from the KMU 244 to the device 206. At 408, the device's private network keys are stored in the USIM 312 and within the secure storage area 310 of the device 206. That is, two copies of the private network keys are stored on the device 206: a first copy within the device's USIM 312, and a second copy within the device's secure storage area 310.

The two copies of the private network keys may be communicated to the device 206 separately to each other. In other words, the private network keys may be communicated to the device's USIM 312, and separately to the device's secure storage area 310. The private network keys may be communicated using a suitable communication protocol, such as over-the-air (OTA).

The KMU 244 may communicate additional information for the network 202 to the device 206 at 406. This information may include information identifying the network 202, and/or information identifying the device 206 within the network 202. The information identifying the network 202 may include a home public land mobile network (HPLMN) code for the network 202 (which may be denoted pHPLMN). This network code may the combination of the mobile country code (MCC) and mobile network code (MNC); i.e. it may be the MCC-MNC code, which uniquely identifies the network operator of network 202, MNO2. The information identifying the device 206 within the network 202 may be an identification code for the device 206. It may be the IMSI for the device 206 within the network 202, which is denoted pIMSI. The pIMSI for device 206 may differ than the IMSI for the device 206 (i.e. the identity code for the device 206 within its home network 200 may be different than its identity code within the guest network 202). This is because there is no roaming agreement between networks 200 and 202. The information identifying the network 202 and the information identifying device 206 within network 202 may be stored within the USIM 312, for example within the data store 316.

Thus, in summary, following 408 the device 206 has stored the following information:
 a copy of the private network keys in the secure storage area 310, which are encrypted and non-readable by the device 206 or its components;
 a copy of the private network keys in the USIM 312, e.g. within the datastore 316;
 a copy of any additional identification information for the network 202 and/or for the device 206 within the network 202 (e.g. within the datastore 316).

Following 406, the USIM 312 may be said to have a dual SIM identity: a first SIM identity for the home network 200, and a second SIM identity for the network 202. That is, the USIM 312 may have stored thereon two SIM profiles: a first profile for the home network 200, and a second profile for the network 202. The network keys for the home network 200 may be stored in the first profile (and so form part of the first SIM identity), and the private network keys for the network 202 may be stored in the second profile (and so form part of the second SIM identity).

Storage of the private network keys and additional identification information for the communication network 202 within the USIM 312 may be facilitated by the provision of additional storage fields within the USIM 312. For example, compared to conventional USIMs, USIM 312 may include additional elementary file (EF) fields to store the requisite information. These additional EFs may be stored within memory in the USIM 312, such as the data store 316. The USIM 312 may include a first additional EF for storing the private network keys pK and pOpc (this EF being denoted herein as EF) a second additional EF for storing the network code pHPLMN identifying network 202 (this EF being denoted herein as $EF_{pHPLMN}$); and a third additional EF for storing the identification code pIMSI for the device within the network 202 (this EF being denoted herein as $EF_{pIMSI}$.

The USIM 312 may additionally store a flag that indicates the device 206 is permitted to access the network 202 (subject to authentication, which will be described below). In the context of the current example, this flag may be referred to as a pEPC flag. The flag may indicate that the USIM 312 has a dual SIM identity. That is, the flag may indicate that the USIM 312 includes a SIM identity (i.e. a SIM profile) for the network 202. This flag may also be stored within an additional EF field. This EF may be denoted herein as $EF_{pEPC}$. Thus, in accordance with the examples described herein, the USIM 312 may include four additional EF fields compared to conventional USIMs.

At 410 the device 206 is authenticated on and attaches to the network 202 using the private network keys stored in the secure storage area 310 on the device.

Figure 5:
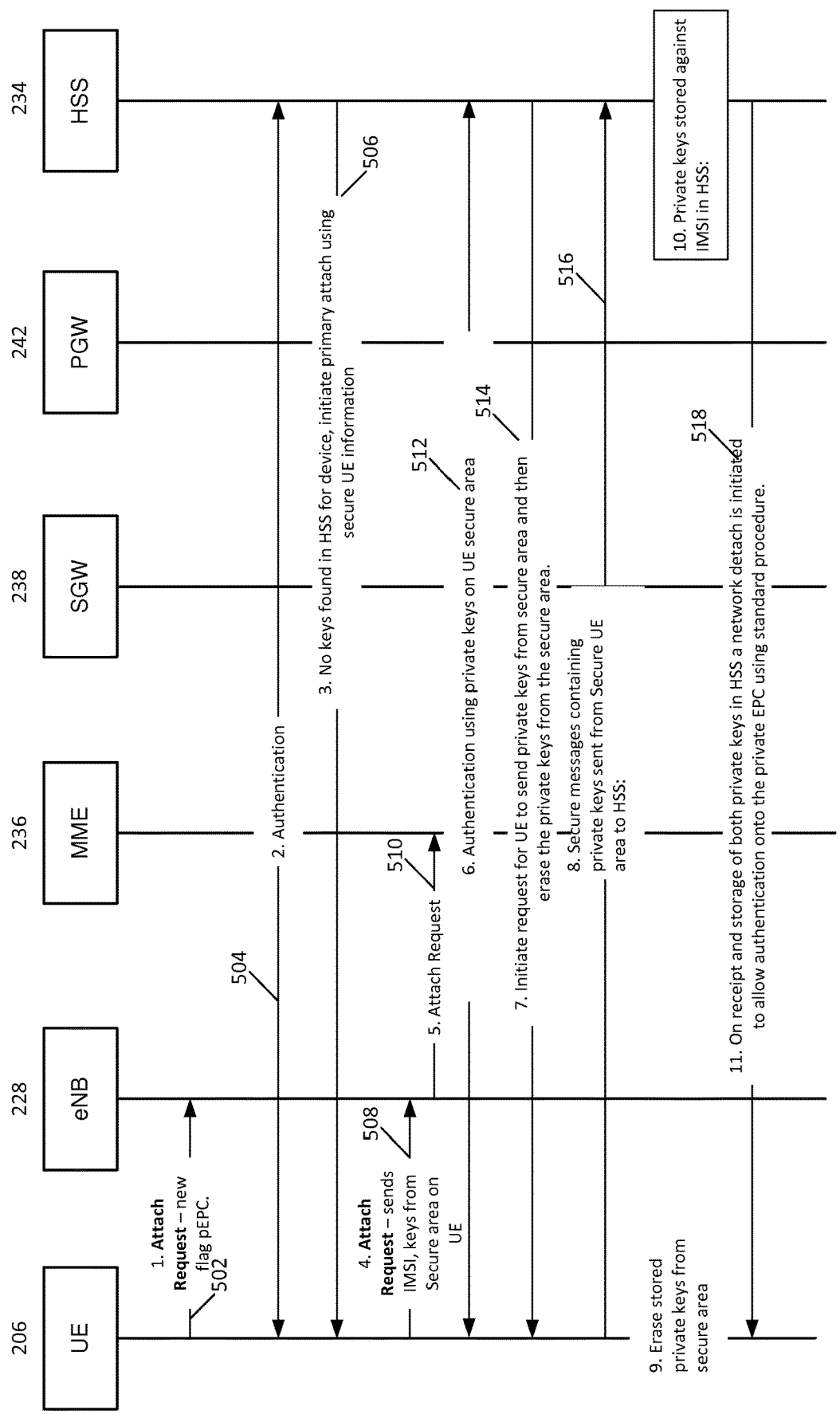
FIG. 5 shows a call flow illustrating the authentication and primary attachment of the device onto the visiting network using network keys stored in a secure area of the device.

FIG. 5 shows a call-flow illustrating how the device 206 is first authenticated onto and attaches to the network 202 using the private network keys stored in the secure storage area 310 of the device. The first attachment of the device to the network 202 following derivation of the network keys for the network 202 may be referred to as the primary attachment.

At 1 (denoted 502), the device 206 communicates a first attach request message to the eNodeB 228 of the network 202 to request primary attachment. This attach request message includes the pEPC flag indicating the device's USIM 312 includes a SIM profile for the network 202. The attach request message may additionally include the identification information for the network 202 (e.g. the pHPLMN) and identification information for the device 206 within the network 202 (e.g. the pIMSI).

At 2 (denoted 504), an authentication process is initiated by the network 202 in response to receiving the attach request message. As part of this process, the HSS 234 is accessed to determine whether private network keys are stored against an identifier for the device 206 (e.g. the device's pIMSI).

Before the primary attachment of device 206 to the network 202, no network keys for the network 202 are stored against the device's identifier within network 202. In other words, the primary attachment is initiated by the device 206 at a time when the network 202 has no network keys stored against the device's identifier.

At 3 (denoted 506), the HSS 234 initiates a primary attachment process in response to determining that no private network keys for the network 202 are stored against the device's identifier. As part of this, the HSS 234 communicates an 'initiate attachment' message to the device 206.

At 4 (denoted 508), the device 206 communicates a second attach request message to request attachment to the network 202. The device communicates the second attach request message in response to receiving the 'initiate attachment' message from the HSS 234. The second attach request message is communicated to the eNodeB 228.

The second attach request message includes a copy of the network keys for the network 202 from the device's secure storage area 310. That is, a copy of the private network keys stored in the device's secure storage area 310 are included within the second attach request message.

At 5 the eNodeB 228, in response to receiving the second attach request message from the device 206, communicates the second attach request message to the MME 236 (denoted by 510).

At 6, the network keys from the secure storage area 310 are used to authenticate the device 206 (denoted by 512). The authentication of the device 206 using these network keys may be performed by the MME 236. The MME 236 may determine that this authentication is a one-time authentication using the network keys stored in the device's secure storage area 310. That is, the MME 236 may authenticate the device 206 using the private network keys stored in the secure area 310 despite there being no copy of these keys stored in the HSS 234. In other words, the one-time authentication is performed at a time when there are no private network keys stored against the device's identifier within the network 202. This is possible due to the high level of security of the secure area 310; this one-time authentication is performed using the network keys stored in the secure area 310 and not those stored in the USIM 312 due to the higher level of security of the area 310 compared to the USIM 312.

The MME 236 may determine that it is to perform this one-time authentication from information included within the first or second attach request messages sent from the device 206. For example, the MME 236 may determine it is to perform the one-time authentication from the flag pEPC and/or in response to receiving the private network keys from the device's secure area 310.

Following completion of 6, the device 206 is authenticated on and attached to the network 202. Thus, to summarize 1 to 6 of the call flow:

A primary attachment of device 206 to network 202 is initiated at a time when no network keys for network 202 are stored against the device's identifier within the network 202.

As part of the primary attachment, the device 206 communicates an attach request message to the network 202 that includes a copy of the network keys for network 202 from the device's secure area 310.

A node of the communication network 202 (in the above example, the MME 236) authenticates the device 206 when there are no network keys for network 202 stored against the device's identifier within the network 202. This authentication is performed using the copy of the network keys for network 202 from the device's secure area 310.

Following authentication of the device 206 on the network 202, at 7 a node of the network 202 (in this example the HSS 234) initiates a request for the device 206 to communicate a copy of its private network keys from the secure area 310 and to delete the copy of the network keys stored in the secure area 310. The network keys sent from the secure area 310 will be used for subsequent attachments of the device 206 to the network 202. The HSS 234 may initiate this request by sending a request message to the device 206 (shown in FIG. 5 at 514). Request message 514 is sent after authentication of device 206 is complete.

At 8 the device 206, in response to receiving the request message 514, communicates a copy of the private network keys from its secure area 310 to the node that communicated the request message 514 (the HSS 234, in this example). This is shown at 516. The device 206 may send the copies of the network keys from its secure area 310 in secure messages. The messages may be encrypted, for example. The messages may be sent according to the OTA protocol; i.e. the messages may be OTA messages. To enhance security, the device 206 may communicate each private network key to the HSS 234 in a separate message; i.e. only a single key is included in each message. Thus, in this example, the device 206 may communicate a first (potentially encrypted) message containing the private network key pK, and a second (potentially encrypted) message containing the private network key pOpc.

At 9, the device 206 deletes the copy of the private network keys from its secure area 310. The device performs this action in response to receiving request message 514. Following 9, only a single copy of the private network keys is stored on the device 206 (those on the USIM 312).

At 10, the HSS 234 stores the device's private network keys received from the secure area 310. The HSS 234 stores these private network keys against an identifier for the device 206. In this example, that identifier is the pIMSI identification code that identifies the device 206 within the network 202.

It is to be appreciated that the numbering of 9 and 10 does not imply a strict temporal order of these activities: 10 may be performed before or after 9.

At 11 the HSS 234 initiates the detachment of the device 206 from the network 202. This permits the device 206 to subsequently attach to the network 202 using a more conventional attachment procedure. The HSS 234 may initiate the detachment of the device from the network 202 by communicating a detach request message 518. The HSS 234 initiates the detachment of the device from network 202 at some time after the device's private network keys have been received and stored (i.e. after the completion of 10).

The above examples describe how the device's private network keys stored in the secure area 310 are used to authenticate the device 206 on the network 202 as part of performing a primary attachment of the device 206 to the network 202.

Subsequent attachments of the device 206 to the network 202 (i.e. attachments following the primary attachment) are performed using the device's private network keys stored in the USIM 312.

Figure 6:
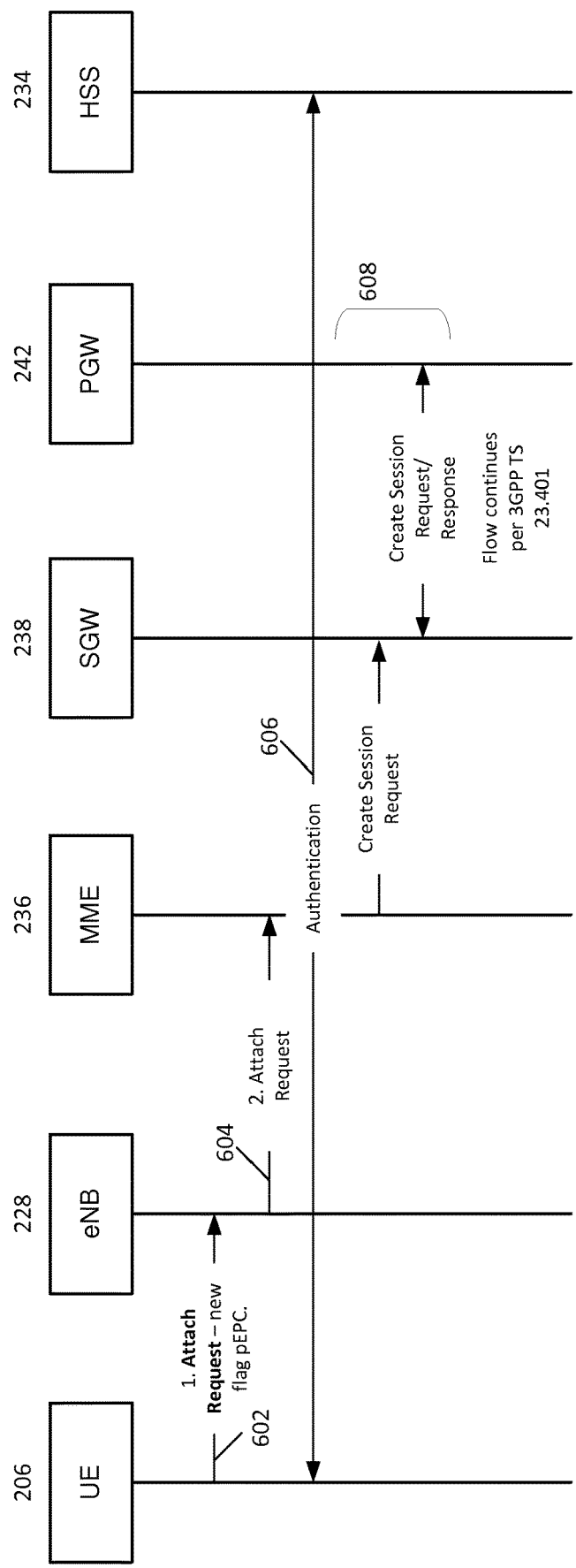
FIG. 6 shows a call flow illustrating a subsequent attachment of the device to the visiting network using network keys stored in the device's USIM.

FIG. 6 shows a call flow illustrating a subsequent attachment of the device 206 to the network 202. A subsequent attachment is one that is performed after the primary attachment is complete. Subsequent attachments are performed at a time when copies of the network keys for network 202 are stored against the device's identifier within the network 202.

Device 206 may initiate the subsequent attachment in response to receiving a broadcast message from the network 202. The broadcast message may advertise the network 202. In this example, the broadcast message is an SIB1 message. Compared to conventional SIB1 messages, the SIB1 message broadcasted by the network 202 contains additional data fields that identify the network 202. These additional data fields include a first data field indicating the network 202 is a private network, and a second data field indicating the identity of the network 202 (e.g. the network operator for network 202). The use of these additional fields to identify the network 202 enables the device 206 to prioritize the network 202 over other networks when in a state in which it is searching for a network to connect to.

Thus the device 206, in response to receiving an SIB1 broadcast message from the network 202, determines the network's identity.

At 1, the device 206 initiates a subsequent attachment by communicating an attach request message 602 to the network 202 in response to receiving the broadcast message.

The attach request message 602 is communicated to the eNodeB 228. The attach request message 602 includes the flag pEPC indicating the device 206 has a dual identity SIM (i.e. indicating that the device's USIM 312 includes a SIM profile for the network 202). It may further include identification information for the network 202 (e.g. the pHPLMN code) and identification information for the device 206 within the network 202 (e.g. the pIMSI code).

At 2, the eNodeB 228 communicates the attach request to the MME 236 in message 604.

The MME 236 then authenticates with the device 206 (illustrated at 606). This authentication process may follow the process outlined for the attach procedure in 3GPP TS 23.401. This process may include the MME 236 issuing an authentication challenge based on the network keys stored against the device's identifier in the HSS 234 (i.e. the network keys stored in the HSS 234 at 10 of FIG. 5). In contrast to the conventional authentication to the home network 200, the device 206 will respond to the MME 236 authentication challenge using the network keys for the network 202 stored in $EP_{pkeys}$ in the USIM 312 instead of the network keys for the home network 200.

Following authentication of the device 206, a session is created as denoted generally at 608 to complete attachment of the device 206 to the network 202 as outlined for the attach procedure in 3GPP TS 23.401. The call flow may then continue in accordance with the attach procedure outlined in 3GPP TS 23.401.

Thus, to summarize the subsequent attachment of the device 206 to the network 202:

- the device 206 initiates the subsequent attachment by communicating an attach request to a node of the network 202 (in this example the eNodeB 228). The attach request includes network credentials for the network 202 (in this example, the pIMSI and pHPLMN).
- the device 206 is then authenticated on network 202 using the network keys from the $EF_{pkeys}$ field in the device's USIM 312 (i.e. the network keys for network 202) instead of the network keys for network 200. The authentication process may be performed by a node of the network 202, which in this example is the MME 236. The authentication process includes the MME issuing an authentication challenge using the network keys stored in the network 202 (e.g. in the HSS 234) against the device's identifier and the device 206 responding to the challenge using the network keys associated with the network 202. That is, the device 206 participates in an authentication process with the network 202 (in particular, with the MME 236) using the network keys for network 202 stored in its USIM 312.
- Following authentication, the device 206 completes its attachment to the network 202. The authentication and completion of the attachment may proceed per the attach procedure in 3GPP TS 23.401.

The above-described approaches for primary and subsequent authentications and attachments to a non-home network may provide several advantages. The approaches enable a device that includes only a single SIM to access two networks that do not have roaming agreements and/or physical connections between them. It retains the security advantages of using a SIM for network authentication without requiring a user to physically swap SIMs when connection to a different network is required. The approaches can also avoid compromising security requirements by avoiding the need to explicitly share key information between the two networks.

In the examples described above, network 202 was a private network. The private network may be of any suitable size. For example, it may be composed of one or more small cells, or it may be composed of one or more macrocells. In other examples, the network 202 may not be a private network but could be some other public network that is not the device's home network.

The above examples have been illustrated in the context of LTE networks. Consequently, the device's SIM has been described as a USIM. In other examples, one or both of the networks 200 and 202 may be a different type of network, such as a GSM or UMTS network. The device's SIM need not be a USIM, but could be a SIM card. The term 'SIM' has been used herein to refer generally to these different types of SIM.

Though some of the above have been described as being performed by particular nodes of the network, it will be appreciated that these activities could be performed by any suitable network node. For example, each activity described above as being performed by an HSS may be performed by an authentication center (AuC).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of authenticating a device subscribed to a first wireless communication network on a second wireless communication network, the method comprising:
    deriving at a node within the first wireless communication network a set of one or more network keys for the second wireless communication network from one or more network keys of the first wireless communication network that uniquely identify the device within the first wireless communication network;
    communicating the derived set of one or more network keys to the device;
    storing a first copy of the derived set of one or more network keys within an identification module at the device and a second copy of the derived set of one or more network keys within a secure area of the device;
    authenticating the device to connect directly to the second wireless communication network using the second copy of the derived set of one or more network keys stored in the secure area of the device; and
    after authenticating the device on the second wireless communication network, communicating a copy of the derived set of one or more network keys from the secure area of the device to a node of the second wireless communication network for use in subsequent attachments of the device to the second wireless communication network.

2. The method as claimed in claim 1, wherein the copy of the derived set of one or more network keys are communicated from the secure area of the device to the node of the second wireless communication network in response to receiving at the device a message requesting the derived set of one or more network keys.

3. The method as claimed in claim 1, further comprising deleting the second copy of the derived set of one or more network keys from the secure area of the device after communication of the derived set of one or more network keys from the secure area to the node of the second wireless communication network.

4. The method as claimed in claim 1, further comprising storing at the node of the second wireless communication the derived set of one or more network keys against an identification code for the device for use in subsequent attachments of the device to the second wireless communication network.

5. The method as claimed in claim 4, wherein the identification code is an international subscriber mobile identity (IMSI).

6. The method as claimed in claim 1, wherein the derived set of one or more network keys for the second wireless communication network are derived by an algorithm which receives as an input the one or more network keys of the first wireless communication network.

7. The method as claimed in claim 1, further comprising subsequently attaching the device to the second wireless communication network using the first copy of the derived set of one or more network keys stored in the identification module of the device at a time after the device has been authenticated using the second copy of the derived set of one or more network keys stored in the secure area.

8. The method as claimed in claim 1, wherein the one or more network keys of the first wireless communication network comprise an authentication key K and an operational code Opc derived from K.

9. The method as claimed in claim 1, wherein the second wireless communication network is a private network.

10. The method as claimed in claim 1, wherein the secure area is a secure element of the device.

11. The method as claimed in claim 1, wherein the node within the first wireless communication network is a key management unit forming part of a subscription management system.

12. The method as claimed in claim 1, wherein the node of the second wireless communication network is a subscriber server.

13. A communication system comprising:
    a first wireless communication network;
    a device subscribed to the first wireless communication network, the device comprising an identification module and a secure area; and
    a second wireless communication network;
    wherein the first wireless communication network comprises a node configured to:
        derive a set of one or more network keys for the second wireless communication network from one or more network keys of the first wireless communication network that uniquely identify the device within the first wireless communication network, and
        communicate the derived set of one or more network keys to the device for storage as a first copy within the identification module and as a second copy within the secure area; and
    wherein the second wireless communication network is configured to authenticate the device using the second copy of the derived set of one or more network keys stored in the secure area of the device to connect the device directly to the second wireless communication network.

14. A device subscribed to a first wireless communication network and configured to be authenticated on a second wireless communication network, the device comprising:
    an identification module storing a set of one or more network keys for the first wireless communication network that uniquely identify the device within the first wireless communication network, the identification module further storing a first copy of a set of one or more network keys for the second wireless communication network received from a node of the first wireless communication network, the set of one or more network keys for the second wireless communication network being derived from the set of one or more network keys for the first wireless communication network; and a secure area storing a second copy of the set of one or more network keys for the second wireless communication network received from the node of the first wireless communication network;

wherein the device is configured to connect directly to the second wireless communication network by participating in an authentication procedure to authenticate itself on the second wireless communication network using the second copy of the set of one or more network keys for the second wireless communication network stored in the secure area.

\* \* \* \* \*